United States Patent [19]
Luick

[11] Patent Number: 5,875,346
[45] Date of Patent: Feb. 23, 1999

[54] SYSTEM FOR RESTORING REGISTER DATA IN A PIPELINED DATA PROCESSING SYSTEM USING LATCH FEEDBACK ASSEMBLIES

[75] Inventor: David Arnold Luick, Rochester, Minn.

[73] Assignee: International Business Machines Corporation, Armonk, N.Y.

[21] Appl. No.: 713,903

[22] Filed: Sep. 13, 1996

[51] Int. Cl.$^6$ .................................... G06F 11/00
[52] U.S. Cl. .................... 395/800.01; 711/169; 711/109; 395/800.11
[58] Field of Search .................... 711/109, 154, 711/169; 395/800.18, 800.01, 800.11

[56] References Cited

U.S. PATENT DOCUMENTS

| | | | |
|---|---|---|---|
| 4,540,903 | 9/1985 | Cooke et al. | 327/221 |
| 4,920,477 | 4/1990 | Colwell et al. | 364/200 |
| 5,018,144 | 5/1991 | Corr et al. | 371/22.36 |
| 5,117,388 | 5/1992 | Nakano et al. | 365/73 |
| 5,134,693 | 7/1992 | Saini | 395/375 |
| 5,182,811 | 1/1993 | Sakamura | 395/800 |
| 5,261,066 | 11/1993 | Jouppi et al. | 395/425 |
| 5,307,506 | 4/1994 | Colwell et al. | 395/800 |
| 5,355,335 | 10/1994 | Katsuno | 365/189.04 |
| 5,398,330 | 3/1995 | Johnson | 395/575 |
| 5,404,486 | 4/1995 | Frank et al. | 395/425 |
| 5,410,550 | 4/1995 | Simmons et al. | 371/61 |
| 5,428,807 | 6/1995 | McKeen et al. | 395/800 |
| 5,588,113 | 12/1996 | Johnson | 395/182.13 |
| 5,638,526 | 6/1997 | Nakada | 395/394 |
| 5,640,402 | 6/1997 | Motika et al. | 371/22.36 |
| 5,663,772 | 9/1997 | Uehara et al. | 348/671 |

Primary Examiner—Alyssa H. Bowler
Assistant Examiner—Mackly Monestime
Attorney, Agent, or Firm—Dan Hubert; Karuna Ojanen

[57] ABSTRACT

Systems are provided for saving register data in a pipelined data processing system, and for restoring the data to the appropriate register in the event of an exception condition. One embodiment concerns a latch feedback assembly, such as a SRL, which includes multiple series-connected latches having a feedback connection between last and first latches. The latches are clocked to temporarily reserve a delayed backup copy of data from the first latch on the last latch. Upon detection of an exception, the backup copy is first preserved by disabling writes to the last latch; then the backup copy is copied to the first latch to restore the first latch to its state prior to occurrence of the exception. Another embodiment involves a register file save/restore mechanism, in which an additional bank of registers, called a "backup register", is coupled to a register file. When data is stored in an address of the register file, the address and its data content are also stored in the backup register. One portion of the backup contains the address, and another portion contains the data. If an exception occurs after data is stored in the register file, the register file may contain incorrect data. However, the backup contains a copy of "correct" data previously stored in the register file. Thus, the register file may returned to its state prior to the exception by copying the correct data from the backup register to the register file.

19 Claims, 10 Drawing Sheets

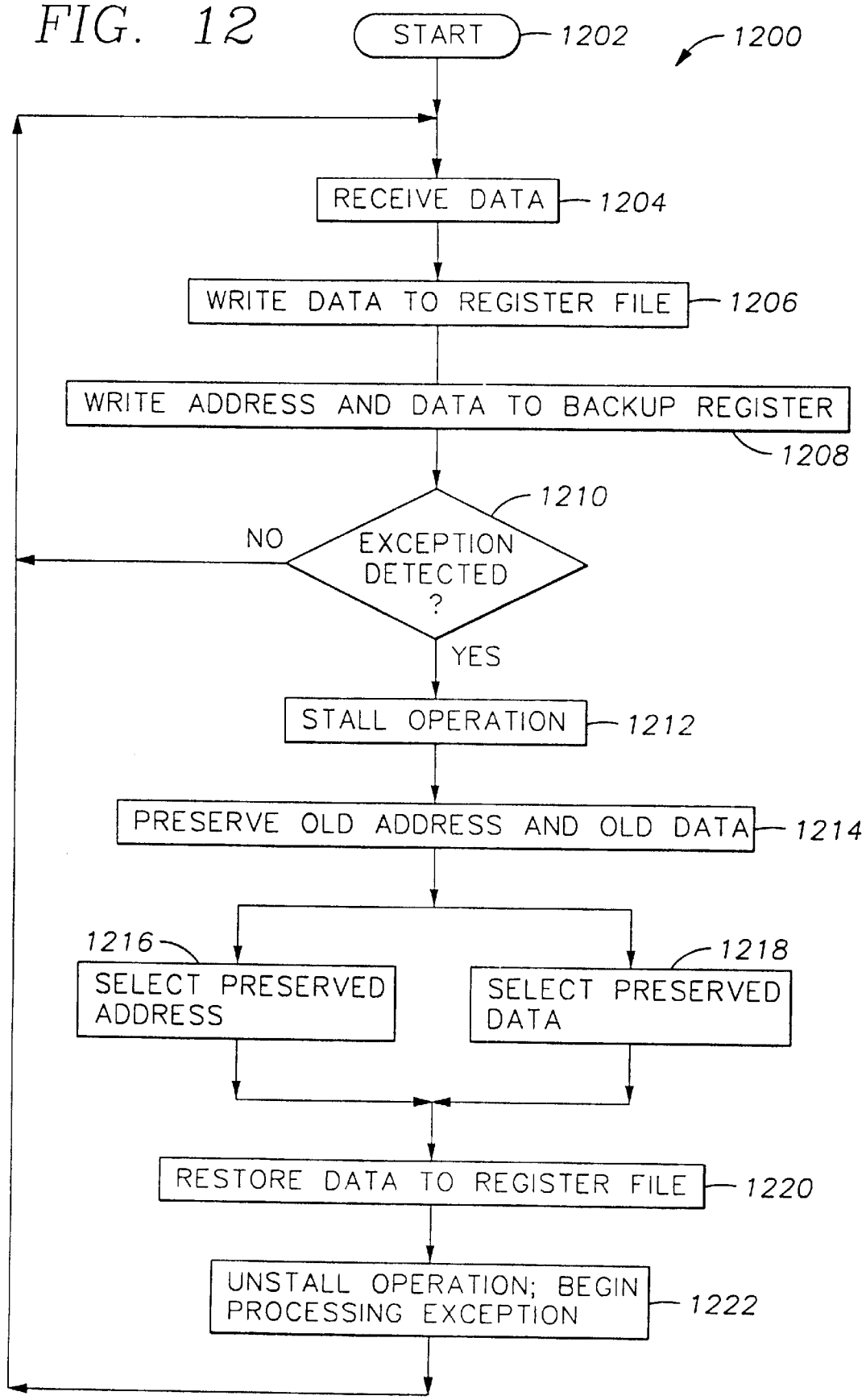

SYSTEM FOR RESTORING REGISTER DATA IN A PIPELINED DATA PROCESSING SYSTEM USING LATCH FEEDBACK ASSEMBLIES

BACKGROUND OF THE DISCLOSURE

1. Field of the Invention

The present invention generally relates to pipelined data processing systems. More particularly, the invention concerns systems for saving register data in a pipelined data processing system, and for restoring the data to the appropriate register in the event of an exception condition.

2. Description of Related Art

Competitive manufacturers in the computer industry are constantly finding new ways to boost the processing speed of their machines. One popular technique to increase processing speed is "pipelining", where certain hardware components or a software compiler assembles machine instructions into especially efficient sequences capable of executing with a modicum of time.

Pipelining is further enhanced with the use of the Very Long Instruction Word ("VLIW"), currently being researched by companies such as IBM Corporation. VLIW fine-grained parallelism exists at the machine instruction level within each task. A VLIW machine uses a compiler to search through a program for machine instructions capable of being executed simultaneously. These instructions are then assembled into a compound VLIW instruction. Each part of a VLIW instruction may control a separate part of hardware, such as an ALU, a path to main storage, or a path to a register. In one VLIW machine cycle these separate resources can all be used; as a result, several basic machine instructions can execute concurrently. Thus, each task can be completed in fewer machine cycles than is possible on a traditional uniprocessor. The so-called "turnaround time" from task initiation to task completion is therefore reduced, making the results available sooner.

As mentioned above, VLIW machines use compilers to construct compound machine instructions for execution by hardware. A well written compiler generates an instruction stream that keeps most of the available hardware resources busy doing useful work on most machine cycles. Accordingly, there are few machine cycles in which hardware resources are dormant.

Usually, this efficiency translates directly into an overall increase in processing speed. Under some conditions, however, problems can result from the heavy utilization of temporary hardware storage areas such as instruction registers, register files, general purpose registers, and the like. In particular, the rapid "back-to-back" execution of instructions can frustrate recovery from "exceptions" such as hardware/software errors, machine checks, and software exceptions. Due to the rapidity at which registers are updated, old data may no longer be available to restore registers to their respective states before occurrence of the exception.

A number of solutions to the foregoing problems have been developed, as described below.

LARGE SCALE SOLUTIONS

Some of these solutions have been applied on a large scale, by managing overall operation of register files.

Wait Before Writing

One approach simply waits one or more cycles after generating an ALU result before committing the result to an architectural register file. During this waiting period, the processor verifies that no exceptions or potential page faults have occurred. If none have occurred, the processor proceeds to commit the ALU result, now verified as exception-free, by writing it to the architectural register file. In processing systems with multiple parallel pipelines, the shorter pipelines do not commit until the longer pipelines complete.

This technique is used to avoid writing potentially incorrect data to the register file. Although this approach may be satisfactory for some applications, it retards the pipeline because, prior to storing data in a register file, the processor frequently stops to verify that an exception has not occurred. Furthermore, these frequent precautionary processor steps are not particularly efficient, because the occurrence of exceptions is rare.

Bypass Lines

A different approach uses bypass lines to handle exceptions. Specifically, some superscalar processors use one or more additional pipeline stages to delay register file write operations by one or more cycles. The actual ALU result is bypassed to the input of other pipeline input stages that may be dependent upon the ALU result. Although this approach may be adequate for certain applications, in large N-way superscaler or VLIW processors, this may result in problems concerning wiring density and the processor's critical path. For register files having 16 write ports and 32 read ports, for example, this requires 512 (32×16) result bypass paths, each path having 64 bits. These complex bypass paths may add significantly to a processor's critical path. In addition, such wiring schemes may be difficult or impossible to implement because of the extreme level of wiring density required.

In highly parallel processors, not implementing result bypasses in the pipeline is one implementation option. For commercial applications, however, dependencies are common and a non-bypassed design can double the number of cycles per iteration of a common operation.

In many pipeline applications, then, the above limitations prevent the known large-scale approaches from providing a completely adequate solution to the storage of register data in spite of possible exceptions.

SMALL-SCALE SOLUTIONS

Although a number of "small-scale" solutions are also available in addition to the large-scale solutions discussed above, these approaches also present certain problems, as shown below.

Shift Register Latch

Registers such as register files, general purpose registers, and the like are often implemented in the form of a Shift Register Latch, or "SRL". FIG. 1 depicts one SRL 100 that is used, among other applications, in the IBM model AS/400 server. The SRL 100 includes first and second latches 102, 104. As an example, the latches may comprise flip-flops such as polarity hold latches.

In the industry, latches are frequently manufactured in pairs, especially in level sensitive scan design ("LSSD") and SRL designs. The latches of each such pair are commonly referred to as "L1" and "L2". L1 and L2 latches have certain slightly different characteristics, which are well known in the art. In the example of the SRL 100, the latches 102/104 form an L1/L2 pair, and are labeled as such.

The first latch 102 receives data on a first input 106. In response to receipt of a first clock signal (C1) on a clock line 108, the first latch 102 provides its input data on an output line 110. The second latch 104 receives the first latch's output on a second input 112. In response to receipt of a second clock signal (C2) on a clock line 114, the second latch 104 provides its input data upon an output line 116.

During normal operations, the second latch 104 simply repeats the first latch's output. The second latch 104 is therefore called a "transient" latch. The second latch 104 may also be used for various ancillary purposes, such as vertical shift-diagnostics, timing, etc. The first clock signal (C1) and second clock signal (C2) are typically 50% duty cycle square waves, which are inverses of each other. As a result, the signal at the second latch's output 116 is delayed by ½ cycle with respect to the signal at the first latch's output 110.

The SRL 100 lacks any mechanism to recover data that is improperly or incorrectly written to the SRL 100. Such data may result, for example, from incorrect data that leads to a failing instruction, a temporary or permanent error in the hardware or software, etc. These conditions may be referred to generally as "exceptions", along with other conditions such as machine checks, machine errors, and software exceptions. Writing data to the latches 102/104 inherently destroys any record of the latches' previous content. Therefore, to avoid writing over correct data that might be needed to recover from an exception, one approach would be to delay writing to the latches 102/104 verifying that no exception has occurred. This diminishes performance of the system, however, and even counteracts some of the distinct advantages of pipelining. In particular, even though exceptions rarely occur, the SRL 100 must frequently stall to avoid overwriting transient data stored in the SRL 100, in case this data might be needed to recover from an exception.

As a result, the SRL 100 is not completely satisfactory for some applications, especially where fast processing speed requires prompt writing of modified data to storage registers.

Shift Register Latch with Inhibit

Various known registers are implemented in a modified form of the SRL, where operation of the second latch is selectively inhibited. The modified SRL 200 (FIG. 2) includes first and second latches 202, 204, of similar construction as the latches 102/104. Accordingly, the latches 202/204 may be latch pairs such as an L1/L2 pair, as illustrated.

Unlike the SRL 100, however, the second latch's output 216 is fed back to a second input 218 of the first latch 202 by means of a restore line 217. The first latch 202 includes an enable line 220 to select between the input signals on the input lines 206, 218. Another difference with respect to the latches 102/104 is that the latch 204 includes an inhibit line 222 to inhibit the signal on the input line 212 from being clocked onto the output line 216. This preserves the current output of the latch 204.

Recovery from an exception in the modified SRL 200 is slightly more flexible than with the SRL 100. When an exception is detected, operation of the second latch 204 is inhibited by triggering the inhibit line 222. Then, an appropriate signal is placed on the enable line 220 to select the input 218 for the first latch 202. When the latch 202 is next clocked, the output 210 is restored to its previous value, obtained from the latch 204.

Although failure recovery in the modified SRL 200 may work well in theory, there are certain problems in actual implementation. As pipelined processing systems typically have high utilization of their resources, data storage registers in pipelined systems are frequently used to write data, thereby displacing old data in these locations. In the modified SRL 200, the output 216 is delayed ½ cycle with respect to the output 210, as described above.

Therefore, if incorrect data is written to the first latch 202, only ½ clock cycle remains to detect the problem before that incorrect data is written to the second latch 204, overwriting the correct data. Unfortunately, ½ clock cycle is seldom sufficient to detect an exception.

As a result, the SRL 200 is not completely satisfactory for some applications, where the need for fast processing speed requires prompt writing of modified data to storage registers.

SRL Pair

FIG. 3 depicts another configuration of SRL, comprising a SRL pair 300. The SRL pair 300 includes first and second latch pairs 302, 304. The first latch pair includes latches 306/308, and the second latch pair includes latches 310/312. This configuration is especially useful for implementation in LSSD circuits, which typically use latch pairs. In particular, each latch pair 302/304 may include an L1/L2 pair.

The latch pairs 302, 304 are coupled serially, as are the individual latches 306/308, 310/312 of each pair. If data is written to the latch 306 under an exception, the latch 306 may be restored to a prior state by copying data back into the latch 306 from the latch 312. If the clock signals C1 and C2 are 50% duty cycle square waves, 180 degrees out of phase, the output of the latch 312 will be delayed by 11/2 cycles with respect to the output of the latch 306. Therefore, if incorrect data is written to the latch 306, 1½ clock cycle remains to detect the problem before that incorrect data is written to the latch 312. In contrast to the modified SRL 200, this additional clock time may be sufficient to recover from the exception in some cases.

However, this approach still may not be completely satisfactory for some applications.

In particular, due to the additional latch 312, the SRL pair 300 occupies twice as much space as the SRL 100, and 33% more space than the SRL 200. As a result, the addition of another latch 312 in each SRL may not be a practical option in applications where register size is limited.

Stable Shift Resister Latch (SSRL)

Another known configuration of SRL is the stable shift register latch ("SSRL"), exemplified by the SSRL 400 (FIG. 4). The SSRL includes a configuration of first, second, and third latches 402, 404, 406, each of similar construction as the latches described above. The SSRL 400 comprises a standard SRL (the first and second latches 402/404) with the addition of a third latch 406. The latches 402/404 may be provided by an L1/L2 pair. The third latch 406 is usually created as a stand-alone custom feature, rather than being a part of an L1/L2 pair. Accordingly, the third latch 406 is denoted by "L3".

Like the SRLs 100 and 200, the first and second latches 402/404 are coupled in series, where the second latch's output depends upon the first latch's output. In the SSRL 400, however, the third latch 406 is also coupled in series with the first latch 402. Therefore, the second 404 and third 406 latches are in parallel with each other. The third latch's output is coupled to an input of the first latch by means of a test line 408. The first latch 402 includes an enable line 410 to select between input signals on the test line 408 and the data input line 412.

The SSRL 400 provides two outputs 416/418, arising from the second latch 404 and the third latch 406, respectively. The outputs 416/418 may represent, for example, former outputs of the first latch 402 from different times in the past. The output 416 of the second latch 404 always provides a slightly delayed copy of the first latch's most recent output. The output 418 of the third latch 406 provides a copy of the first latch's most recent output, or a copy of an older output from the slightly delayed first latch if the third latch's inhibit line 414 has been triggered (preventing overwriting of old data in the third latch 406). In normal operation, the second latch 404 replicates the most recent output of the first latch 402; and the third latch 406 replicates the next-previous output of the first latch 402.

The SSRL 400 may be tested in a number of different ways. For example, the first and second latches 402/404 may be tested by sequentially advancing data through the first latch 402 and the second latch 404. Similarly, the first and third latches 402/406 may be tested by sequentially advancing data through the first latch 402 and the third latch 406. The test line 408 is provided to facilitate another type of testing of the SSRL 400, in which the SSRL 400 and adjacent SSRLs (not shown) are cooperatively operated as a shift register.

By providing dual outputs 416/418, the SSRL 400 has satisfied the needs of many applications for many years. However, for those users requiring a storage register capable of fully recovering from exceptions, known uses of the SSRL 400 are not completely adequate. Namely, the SSRL 400 is used to recover from exceptions in the same manner as the modified SRL 200, as described above. In this respect, the SSRL 400 may be somewhat limited for use in certain applications, as described above in conjunction with the modified SRL 200.

In many pipeline applications, then, the above limitations prevent the known small-scale approaches from providing a completely adequate solution to the storage and restoration of register data in spite of possible exceptions.

BRIEF SUMMARY OF THE INVENTION

Broadly, the present invention involves systems for saving register data in a pipelined data processing system, and for restoring the data to the appropriate register in the event of an exception condition. The invention is applicable to VLIW, super-scaler, and other computer architectures as well.

A first embodiment concerns a latch feedback assembly, such as a SRL, configured to restore register data in a pipelined processing system. The latch feedback assembly includes multiple series-connected latches having a feedback connection between last and first latches, where the latches are clocked so that the last latch temporarily reserves a delayed backup copy of data from the first latch. Upon detection of an exception, the backup copy is first preserved by disabling writes to the last latch; then the backup copy is copied to the first latch to restore the first latch to its state prior to occurrence of the exception.

A second embodiment of the invention concerns a register file save/restore mechanism including a backup register coupled to the register file. The backup register includes a bank of multiple "data save registers". When data is stored in an address of the register file, the data and its address are also stored in the backup register. One group of data save registers contains addresses, whereas another group contains data corresponding to the addresses. If an exception occurs after data is stored in the register file, the register file may contain incorrect data. However, the data save register contains a copy of "correct" data previously stored in the register file. Therefore, the register file may returned to its state prior to the exception by copying the correct data from the data save register to the register file.

The invention includes a number of different aspects. In addition to hardware components, such as the latch feedback assembly and register file save/restore mechanism mentioned above, the invention includes methods for operating the same. The invention further contemplates improved methods for operating a known SRL pair as described in greater detail below.

The present invention provides a number of distinct advantages. The invention helps expedite operations of processing systems with parallel pipelines, since shorter pipelines can commit without having to wait to determine whether longer pipelines have experienced an exception. If such an exception has occurred, potentially incorrect values in the pipelines are replaced with a delayed copy of the correct data, stored for this purpose. The latch feedback assembly and register file save/restore mechanism of the invention do require additional time to recover from an exception, compared to the technique of simply waiting to commit until determining that no exceptions have occurred. However, this additional time incurred on the rare occasions that exceptions occur is substantially more efficient than delaying commitment of every pipeline operation pending error-free notification.

More specifically, the latch feedback assembly of the invention provides a number of particular advantages. For instance, there is a maximum delay between the first and last latches, thereby yielding the greatest possible time to replace incorrect data in the first latch with previous data still resident in the last latch. Advantageously, this may be achieved using only three latches, helping to minimize circuit space. In this respect, another benefit of the invention is that two latch assemblies may be efficiently formed from three existing latch pairs, where one pair is divided between the two latch assemblies. Latch feedback assemblies of the invention are especially beneficial for use in "wiring dominated" circuits, where the connection of many conductors to the circuit results in a significant amount of unused silicon area. This unused silicon can be conveniently used to implement latches in addition to the L1/L2 pair normally present in a SRL.

The register file save/restore mechanism of the invention also provides a number of specific advantages. Chiefly, the backup register contains a "backup" copy of data previously stored in the register file, available for copying back to the register file in the event of an exception. This embodiment is especially beneficial for use in "silicon dominated" circuits, where available silicon area is minimal, but additional conductors may still be attached to the circuit. These conductors are used to attach ports of the register file to the data save register, located elsewhere.

DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 12 is a flowchart illustrating an exemplary sequence of steps for operating a register file save/restore mechanism pursuant to the invention.

DESCRIPTION OF PREFERRED EMBODIMENTS

LATCH FEEDBACK ASSEMBLY: HARDWARE COMPONENTS & INTERCONNECTIONS

Figure 1:
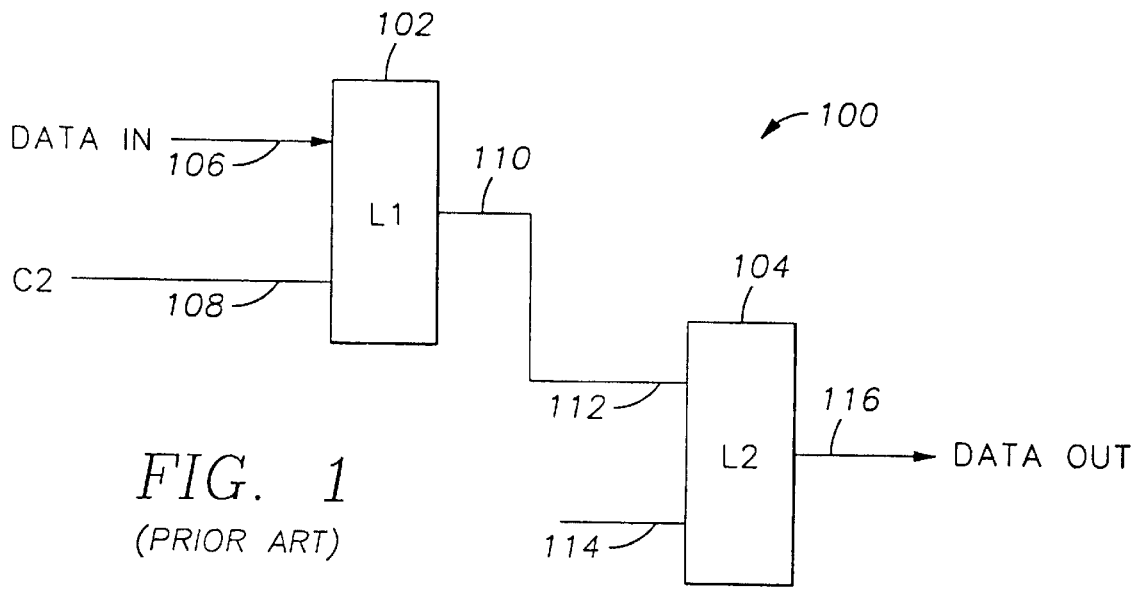
FIG. 1 is a hardware diagram of a standard SRL.

According to one aspect of the invention, a hardware apparatus is provided, comprising a latch feedback assembly for use in an application such as a pipelined processing system.

Single SRL

In one embodiment (FIG. 5), the invention may be embodied by the latch feedback assembly 500. The assembly 500 includes first, second, and third latches 502, 503, 504. The latches 502–504 may comprise flip-flops configured as polarity hold latches, for example. The latches 502–504 are connected in series. Specifically, an output line 506 of the first latch 502 is coupled to an input line 508 of the second latch 503, and an output line 510 of the second latch 503 is coupled to an input line 512 of the third latch 504. A feedback line 513 couples an output line 514 of the third latch 504 to a first input line 516 of the first latch 502. The first latch 502 additionally includes a second input 518 for receiving data from outside the assembly 500. A signal on a select line 520 selects between inputs on the first and second input lines 516, 518.

The output of the assembly 500 is taken at the output line 510 of the second latch 503. The third latch 504 serves as a backup copy of the first latch's contents, as discussed in greater detail below.

The assembly 500 also includes a number of clock sources to providing timing for the latches 502–504. Specifically, a first clock source 522 provides a first clock signal C1 to the first latch 502. A second clock source 523 provides a second clock signal CA to the second latch 503. Likewise, a third clock source 524 provides a third clock signal CB to the third latch 504. Each clock source may comprise, for example, a clock driver.

Preferably, each of the clock sources 522–524 includes one or more input lines as well as an inhibit line that inhibits the clock source's output. For example, the clock source 524 is shown with input lines 524a–524b and inhibit line 524c.

The clock sources generate clock signals all having the same frequency. Accordingly, these clock signals all have the same period. The clock signals may have the same or different duty cycles. In an illustrative embodiment, the clock signals may utilize 50% duty cycle. However, as discussed further below, lesser duty cycles such as 15% may be used for certain applications.

As discussed in greater detail below, the inverse of clock signal C1 is referred to as C2. The clock signal CA is delayed an amount less than one cycle from C2. Likewise, the clock signal CB is delayed an amount less than one cycle from CA.

SRLs with Shared Latch

Figure 6:
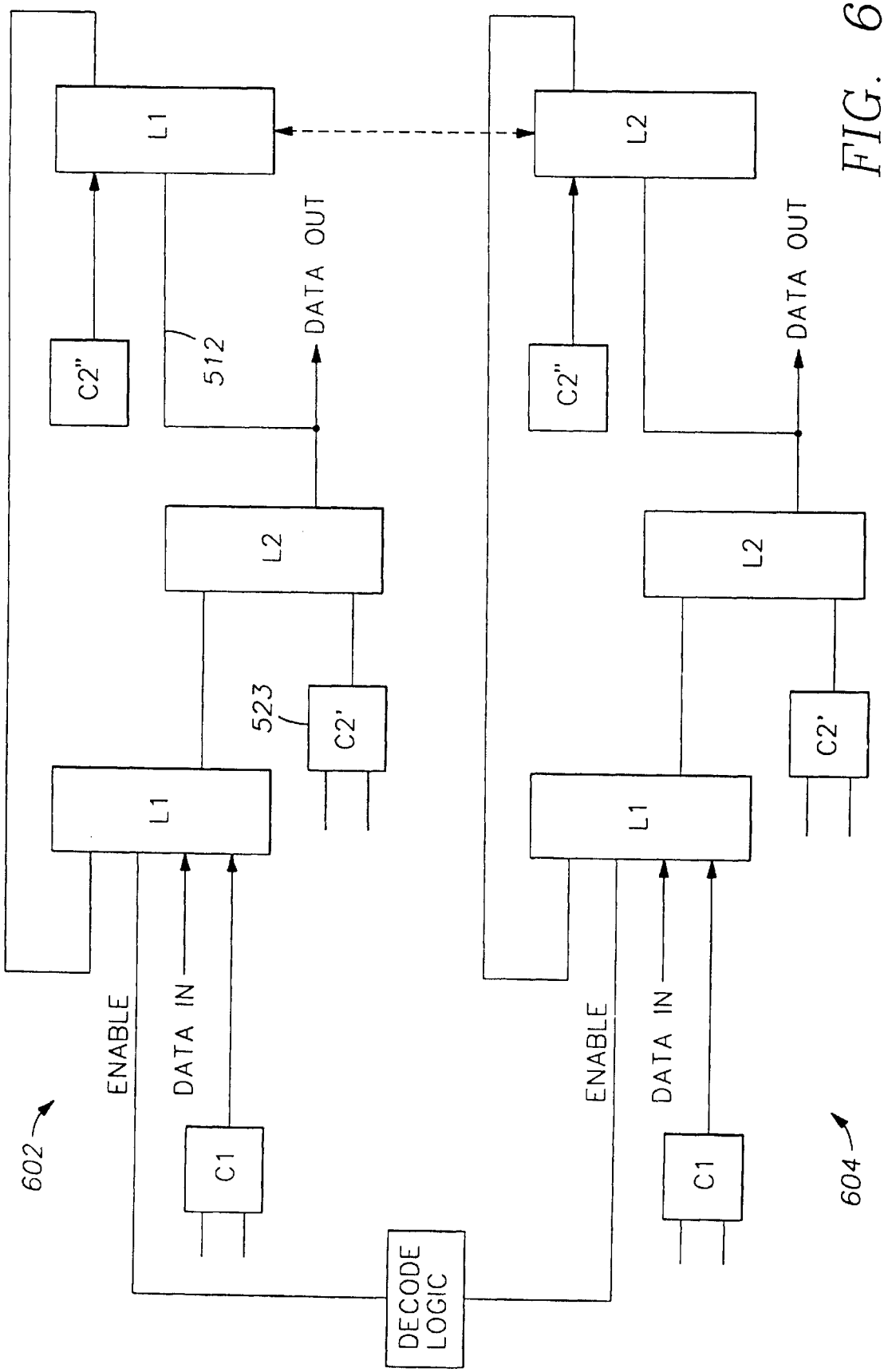
FIG. 6 is a hardware diagram of dual latch feedback assemblies with a shared L1/L2 pair, in accordance with the present invention.

To implement a latch feedback assembly of the invention with improved efficiency, the third latch of each assembly may be part of an L1/L2 pair, where the other latch of that L1/L2 pair is used by another latch assembly. FIG. 6 depicts latch assemblies 602 and 604 that exemplify such an arrangement.

In this arrangement, an L1/L2 pair is utilized as follows: the L1 latch 606 is implemented in the latch assembly 602, and the L2 latch 608 is implemented in the latch assembly 604.

Series-Extended Latch Feedback Assembly

According to another embodiment of the invention, a modified latch feedback assembly is provided by adding one or more further latches in series with the third latch. As discussed in greater detail below, the additional latches serve to provide an output signal delayed by an additional amount with respect to the output of the third latch.

Figure 7:
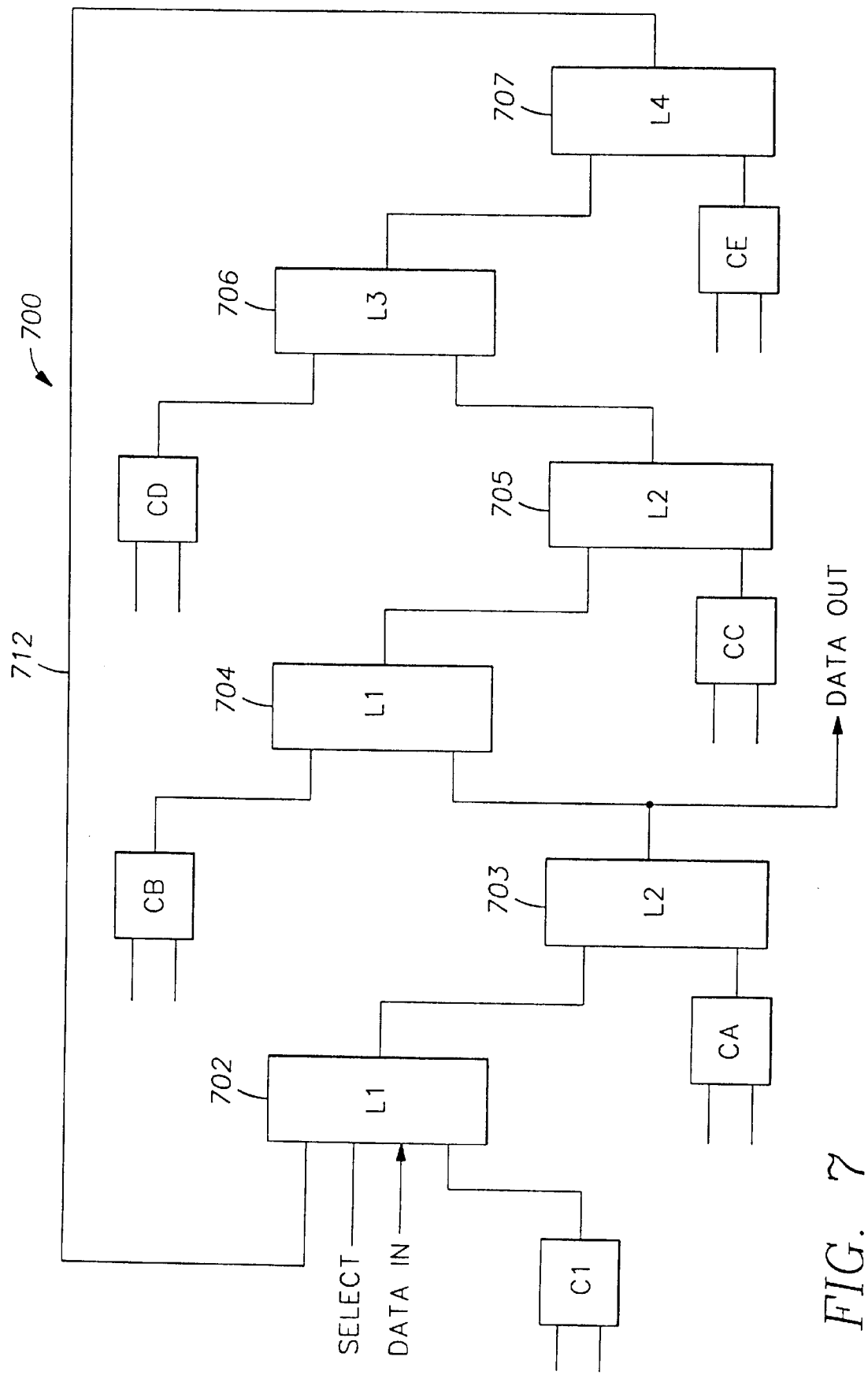
FIG. 7 is a hardware diagram of a series-extended latch feedback assembly, in accordance with the present invention.

FIG. 7 shows a series-extended latch feedback assembly 700 to illustrate an example of this embodiment. In addition to first, second, and third latches 702–704, a number of additional latches 705–707 are also provided. Although three additional latches 705–707 are shown in the example of FIG. 7, any number of one or more additional latches may be used, depending upon the needs of the particular application. Also, the total number of latches used may be odd or even, depending upon the application. Each of the additional latches may be an L1, L2, or another type of latch. Although not essential, in the illustrated example the latches 705 and 707 may be L2 latches with the latch 706 being an L1 latch so that the latch assembly conveniently uses exactly three L1/L2 latch pairs.

The output from the final latch (707 in the illustrated example) is returned to the first latch over a feedback line 712. Thus, the added delay of each latch 705–707 provides an output signal delayed by an additional amount with respect to the output of the third latch 704. The amount of this delay, as well as its usefulness, are described in greater detail below.

LATCH FEEDBACK ASSEMBLY: OPERATION

In contrast to the various hardware embodiments described above, another aspect of the invention concerns a method for operating a latch feedback assembly in a pipelined processing system. As one example, this method may be performed by a sequential controller or other logic circuitry in a pipelined processing system that manages operation of a latch feedback assembly according to a sequence of method steps, as illustrated below.

Single SRL

A. Timing

In addition to the hardware components and interconnections of the latch feedback assembly 500 (FIG. 5), a distinct advantage of the invention is the timing used to drive the various latches of the assembly 500. As discussed in greater detail below, clock signals with a selected interrelationship are used to develop a delayed copy of the first latch's content, with as much delay as possible relative to the number of latches in the assembly 500.

Figure 8:
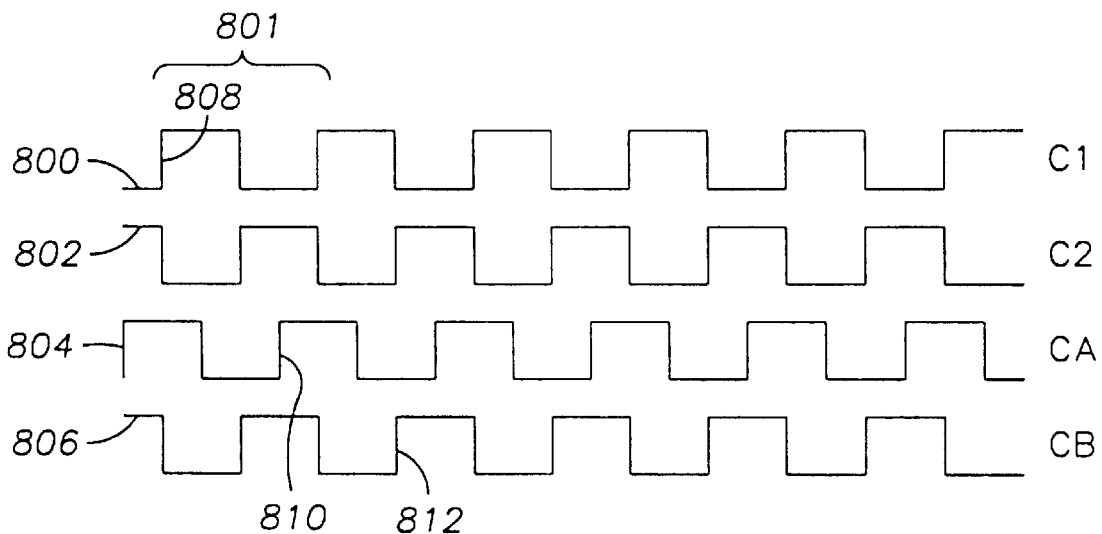
FIG. 8 is a clock timing diagram illustrating a first exemplary clocking scheme for use with a latch assembly of the invention.

As an introduction to the operation of the latch assembly 500, the timing of the latch assembly 500 is depicted in FIG. 8. The first latch 502 is clocked by the clock source 522, which produces a signal C1, shown in FIG. 8 as 800. The signal C1 (800) has a period shown by 801. Although other clock signals in the latch assembly 500 are different in phase, each has substantially the same period 801.

Inputs to the clock source 522, as known in the art, may include the signal C1 (800) and a signal C2 (802), which is the inverse of C1 (800). The clock source 522, which comprises a clock driver in this arrangement, provides an output of the signal C1 (800). As illustrated, the other clock sources 523–524 also comprise clock drivers with a similar relationship between their inputs and outputs.

The second latch 503 is clocked by the clock source 523, which produces a signal CA (804). In the illustrated embodiment, the signal CA (804) is delayed by three-fourths of a clock period with respect to C1 (800). The signal CA (804) may be delayed a greater amount if desired; however, the delay must be less than one clock period 801 to prevent pipeline stall.

The third latch 504 is clocked by the clock source 524, which produces a signal CB (806). In the illustrated embodiment, the signal CB (806) is delayed three-fourths of a clock period with respect to CA (804). The signal CB (806) may be delayed a greater amount if desired; however, the delay must be less than one clock period 801 to prevent pipeline stall.

Due to the successive delays between the clock sources 522–524, the signal on the output line 514 of the third latch 524 is delayed by 1½ clock cycles with respect to the signal on the output line 506. Accordingly, after an exception condition changes the signal on the output line 506, 1½ clock cycles still remain to restore the correct value to the latch 502 by copying this value from the output line 514 via the feedback line 513. This procedure is described in greater detail below.

B. Overall Sequence of Operation

Figure 9:
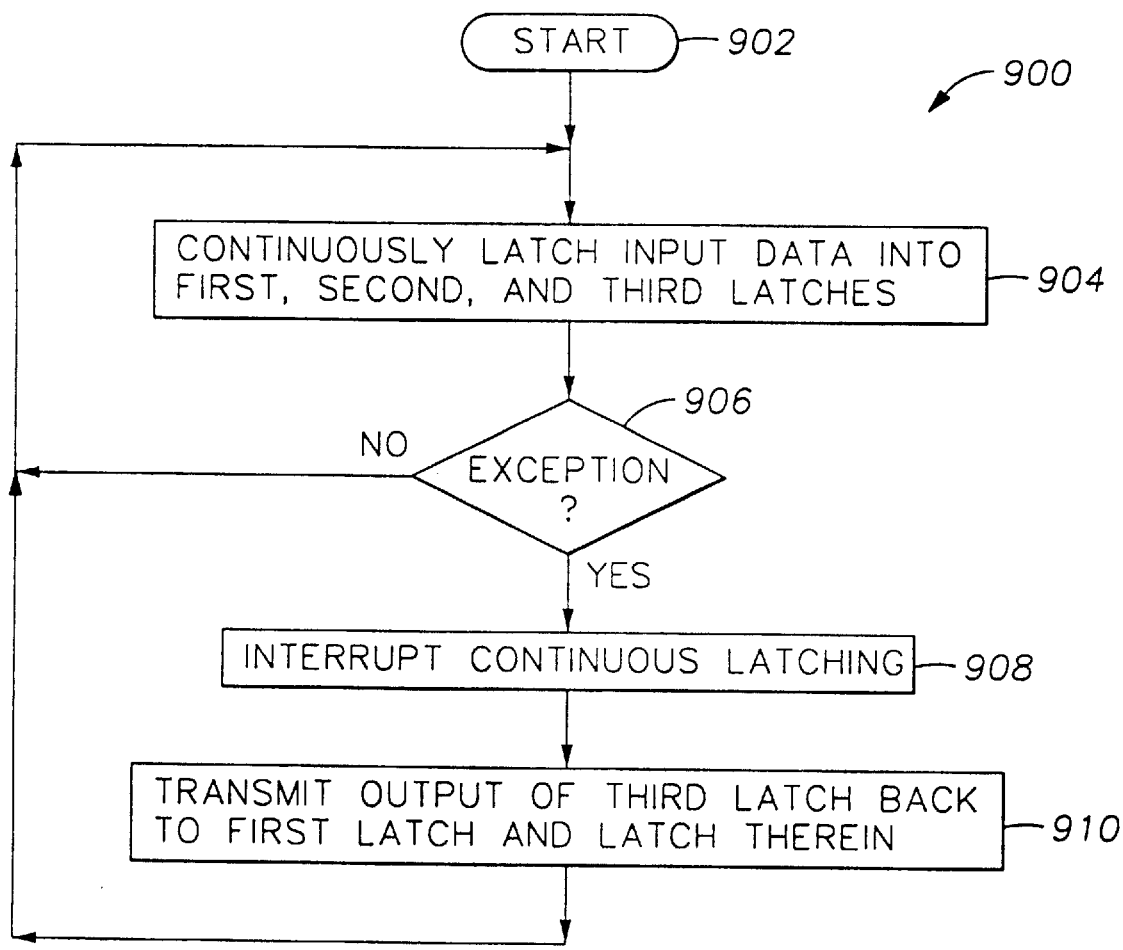
FIG. 9 is a flowchart illustrating an exemplary sequence of steps for operating a latch feedback assembly in accordance with a first embodiment of the present invention.

FIG. 9 provides a sequence of steps 900 describing the overall operation of the latch feedback assembly 500 based upon the timing events discussed above in FIG. 8. After the sequence 900 begins in task 902, data in task 904 is sequentially latched into the first latch 502, second latch 503, and third latch 504. These events are responsive to (and occur shortly after) rising clock edges 808, 810, and 812, respectively. When each clock signal CA and CB is delayed ¾ period from the preceding clock signal, then the output on the third latch 504 is delayed by 1½ periods with respect to the output of the first latch 502, as illustrated.

Query 906 asks whether an exception has been detected by circuitry external to the latch assembly 500. If not, task 904 continues to sequentially advance data through the latches 502–504. If an exception has been detected, however, query 906 advances to task 908, which interrupts the operation of task 904. In particular, task 908 triggers the inhibit line 524c to temporarily inhibit the clock source 524, thereby preserving the output of the third latch 504. At this time, the operation of the first and second latches 502–503 may also be stalled by activating respective inhibit lines (not shown) of the clock sources 522–523.

Next, task 910 transmits the output of the third latch 504 back to the first latch 502 via the feedback line 513. This value, which represents a past output of the first latch 502, is thus used to reset the first latch 502 as it was prior to occurrence of the exception. A particular benefit of the illustrated embodiment is the 1½ clock cycle delay between outputs of the third 504 and first 502 latches. Thus, when an exception is detected, a time period of 1½ clock cycles exists to halt clocking of the third latch 504 to preserve its output value.

The signal on the feedback line 512 is directed into the latch 502 by placing an appropriate signal on the select line 520, thereby selecting the input 516 rather than the input 518. Accordingly, the first latch 502 is then clocked so that the latch 502 provides the output signal copied from the third latch 514. After task 910, clocking of all latches, including the third latch 504, resumes in task 904.

Series-Extended Latch Assembly

A. Timing

In the series-extended latch feedback assembly 700, like the latch feedback assembly 500, clock signals with a selected interrelationship are used to develop a delayed copy of the first latch's content, with as much delay as possible relative to the number of latches in the assembly 700. With the latch feedback assembly 700, however, the aggregate delay between first and last latches is increased by including a series of additional intermediate latches.

The timing of the latch feedback assembly 700 is similar to that of FIG. 8. Namely, each latch in the series is clocked by a signal that is delayed by some amount with respect to the previous latch's clock signal. As an example, this amount may be ¾ clock period, as in FIG. 8. However, as discussed above, the delay between successive clock signals may be any amount less than one clock signal.

A further benefit may be realized by using clock signals with less than 50% duty cycle. Chiefly, with many more latches in the assembly 700, reducing the duty cycle of the clock signals decreases the likelihood that clock pulses of different clock sources will overlap. This in turn reduces the likelihood of hysteresis or other process interrupting the smooth clocking of data signals from the first latch 702 to the last latch 707.

Figure 10:
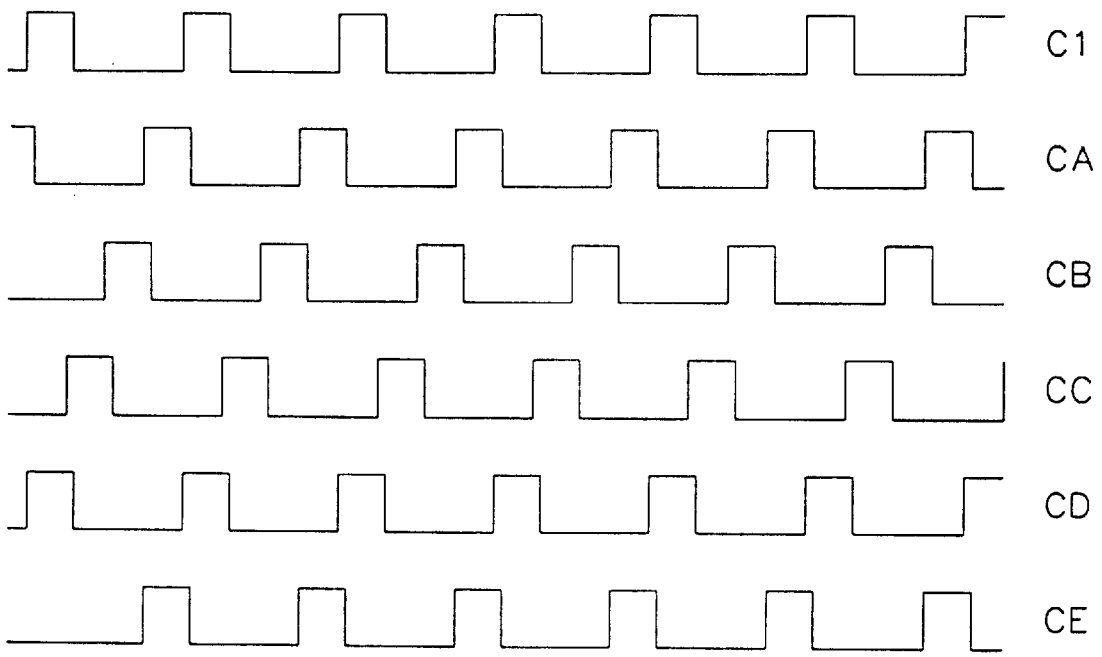
FIG. 10 is a clock timing diagram illustrating a second exemplary clocking scheme for use with a latch feedback assembly of the invention.

FIG. 10 illustrates an illustrative clocking scheme for the latch feedback assembly 700, where clock signals with a 30% duty cycle are used.

B. Overall Sequence of Operation

The latch feedback assembly 700 may employ the same operating sequence as the latch assembly 500, as shown in FIG. 9. However, the process of continuously latching a data signal through all latches 702–707 takes longer than latching a data signal through the three latches 502–504. Consequently, the output of the final latch 707 is delayed more with respect to the output of the first latch 702. The latch assembly 700 therefore retains the final latch's output signal for longer than the latch assembly 500. In the illustrated example 700, a data signal appears on the last latch's output 4½ clock cycles after it appears at on the first latch's output. As a result, the latch assembly 700 is capable of restoring an old data signal from the final latch 707 to the first latch 702 with less advance notice.

SRLs with Shared Latch

Each of the latch assemblies 602, 604 (FIG. 6) is operated in a manner similar to the latch assembly 500. The latch assemblies 602, 604 may also be operated together, for example, to shift data between the assemblies 602, 604 during certain diagnostic testing routines, some of which are well known in the art.

SSRL

Another aspect of the present invention concerns a new process for operating the known SSRL 400. As mentioned above, known exception recovery techniques for the SSRL 400 operate in the same manner as those of the modified SRL 200, as described above. In particular, when an exception is detected, operation of the second latch 204 is inhibited by triggering the inhibit line 222. Then, an appropriate signal is placed on the enable line 220 to select the input 218 for the first latch 202, thereby restoring the output 210 with its previous value, obtained from the latch 204.

The problem with known applications of the SSRL 400 is that, after incorrect data is written to the first latch 402, only ½ clock cycle remains to detect the problem before that incorrect data is written to the second latch 404. Unfortunately, ½ clock cycle is seldom sufficient to detect an exception.

Therefore, pursuant to one embodiment of the present invention, a supplementary clock source (not shown) is used to drive the third latch 406. The supplementary clock source provides a clock signal that is delayed from C1 by an amount as great as possible, but less than one clock period. This is in contrast to the known use of the SSRL 400, where C2 (the inverse of C1) is always used to clock the latch 406.

In the illustrated embodiment, an exemplary delay may be ¾ or ⅞ clock period, for example. In an embodiment where the third latch 406 is driven with a clock signal delayed by ¾ clock period with respect to C1, the output of the third latch 406 is likewise delayed by ¾ period with respect to the output of the first latch 402. Accordingly, a delay of ¾ period is provided to restore the output of the third latch 406 to the first latch 402.

REGISTER FILE SAVE/RESTORE MECHANISM: HARDWARE COMPONENTS & INTERCONNECTIONS

General Layout

Figure 11:
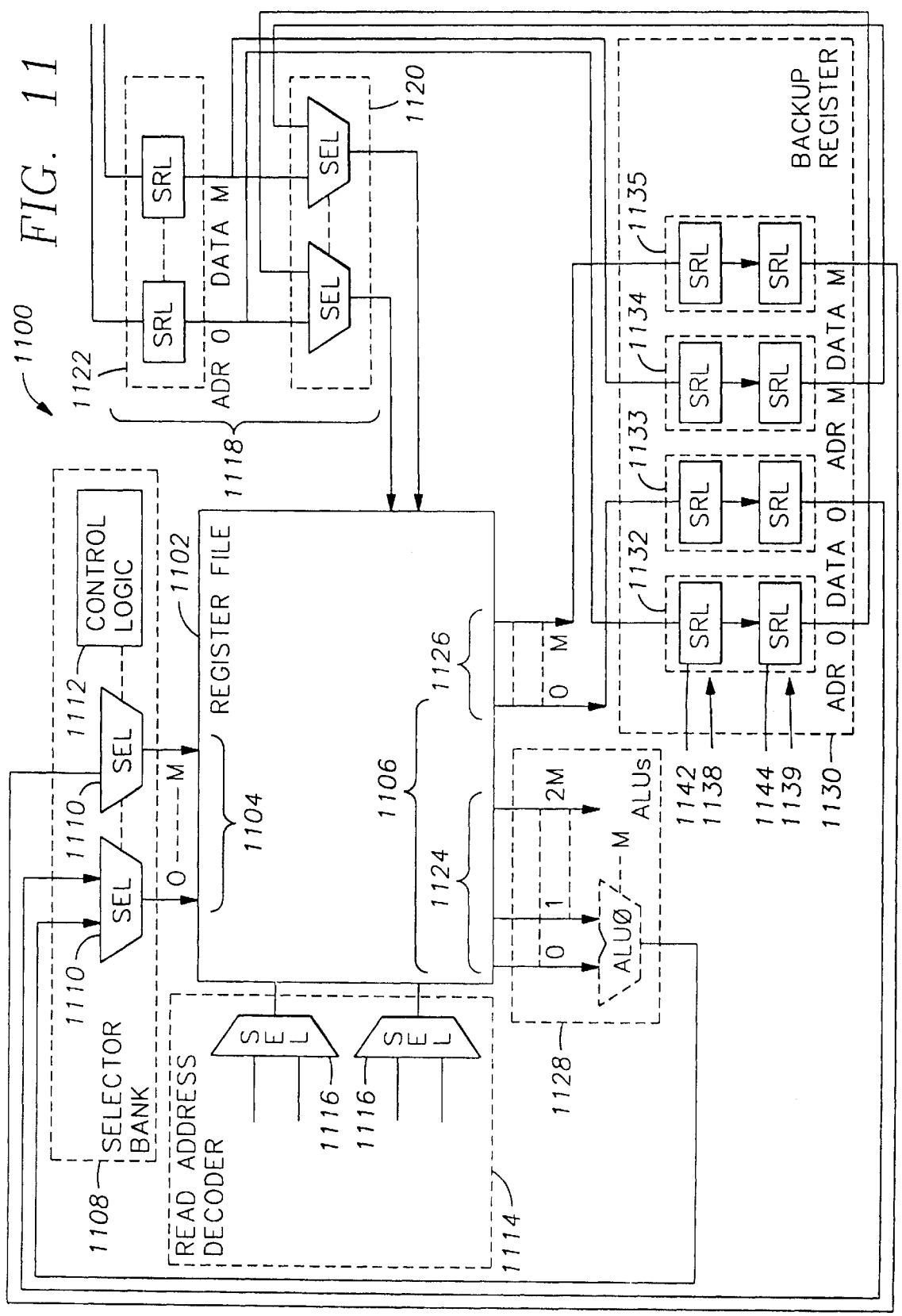
FIG. 11 is a hardware diagram of an illustrative implementation of register file save/restore mechanism pursuant to the invention.

As described above, one aspect of the present invention concerns storage registers constructed of multiple latch feedback assemblies, where the individual latch feedback assemblies restore old data in the event of a exception condition. A different aspect of the invention concerns a register file save/restore mechanism, with a backup register separate from the storage register. The backup register saves backup copies of register data in a pipelined data processing system and restores the backup data to the appropriate register in the event of a exception condition. As explained in greater detail below, the register file save/restore mechanism of the invention may optionally employ latch assemblies such as those described above as subcomponents. FIG. 11 illustrates one embodiment of the register file save/restore mechanism 1100 of the invention.

The mechanism 1100 includes a register file 1102, which may be a digital storage register such as a general purpose register ("GPR"). The register file includes write ports (input ports) 1104 and read ports (output ports) 1106. The write ports 1104 are coupled to a selector bank 1108, comprising multiple individual selectors 1110. Each selector 1110 has multiple inputs and a single output that is coupled to one of the write ports 1104. In response to a signal from control logic 1112, each selector 1110 places a signal from one of its inputs upon the output of that selector 1110.

Read Address Decoder

The mechanism 1100 also includes a read address decoder 1114. The read address decoder 1114 includes multiple selectors 1116, each of which has multiple inputs and a single output, the output being coupled to a read address input (not shown) of the register file 1102. The read address decoder 1114 may additionally include control logic (not shown) like the control logic 1112, to manage operation of the selectors 1116. The address read decoder 1114 serves to provide a read address to the register file 1102 in response to an input signal. As an example, the address read decoder 1114 may operate in accordance with the principles of known address read decoders.

Write Address Decoder

The mechanism 1100 also includes a write address decoder 1118. The write address decoder 1118 includes multiple selectors 1120 and multiple SRLs 1122. Each of the selectors 1120 has multiple inputs and a single output, the output being coupled to a write address inputs (not shown) of the register file 1102. One of each selector's inputs is coupled to a respective one of the SRLs 1122. Collectively, the SRLs 1122 receive an input signal representative of a write address in the register file 1102. The write address decoder 1118 may additionally include control logic (not shown) like the control logic 1112, to manage operation of the selectors 1118.

Read Ports

In the illustrated embodiment, the read ports 1106 include multiple ALU ports 1124 and multiple address data/save register ("ADSR") ports 1126. The read ports 1106 may be allocated in various ways, depending upon the requirements of the application, as discussed in greater detail below.

ALUs

Each of the ALU ports 1124 is coupled to one or more one of multiple ALUs 1128. Generally, the ALUs 1128 operate to perform arithmetic operations on data retrieved from the register file 1102. These operations may be conducted in accordance with known principles, for example.

Backup Register

The ADSR ports 1126 are coupled to a backup register 1130. The backup register 1130 includes multiple ADSRs 1132–1135. Each of the ADSRs 1132–1136 may include multiple ranks, as discussed in greater detail below. In the illustrated example 1100, the ADSRs 1132–1136 are depicted with first and second ranks 1138–1139.

Among the ADSRs 1132–1135, there are data registers and address registers. In the present example, there are data registers 1133, 1135, and address registers 1132, 1134. The backup register 1130 receives inputs from two different sources, as follows. In particular, each data register 1133, 1135 in the backup register 1130 receives its input from a different one of the ADSR ports 1126. Each of the address registers 1132, 1134 receives its input from a corresponding one of the SRLs 1122 of the write address decoder 1118.

The backup register 1130 provides output to two different recipients, as follows. Each of the data registers 1133, 1135 provides an output to a corresponding one of the selectors 1110. Thus, under management of the control logic 1112, each selector 1110 takes its input either from the ALUs 1128 or the backup register 1130. In contrast to the data registers 1133, 1135, each of the address registers 1132, 1134 provides an output to a corresponding one of the selectors 1120. Thus, under management of write address control logic (not shown), each selector 1110 takes its input either from the SRLs 1122 or the backup register 1130.

As mentioned above, FIG. 11 depicts each ADSR 1132–1136 with first and second ranks 1138–1139. Each ADSR is actually a mini-pipeline, including multiple latching stages. In the illustrated example, each ADSR includes two latching stages: a first rank latching stage and a second rank latching stage. To illustrate a particular example, the ADSR 1132 has a first rank latching stage 1142 and a second rank latching stage 1144.

Figure 2:
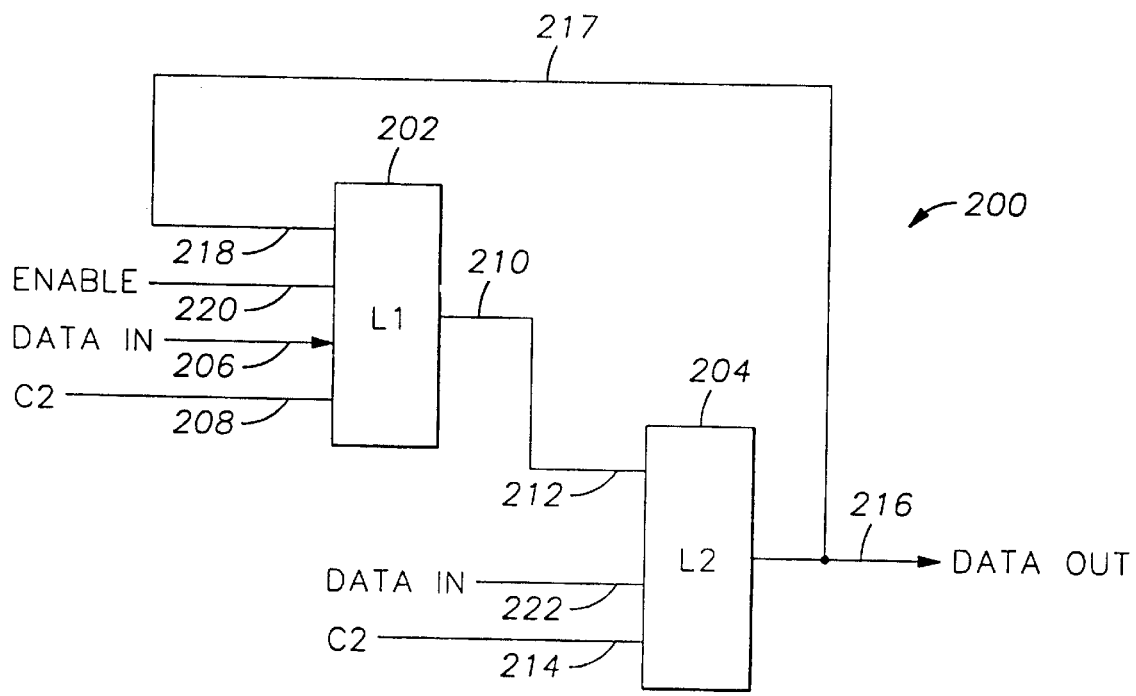
FIG. 2 is a hardware diagram of a modified SRL.
Figure 3:
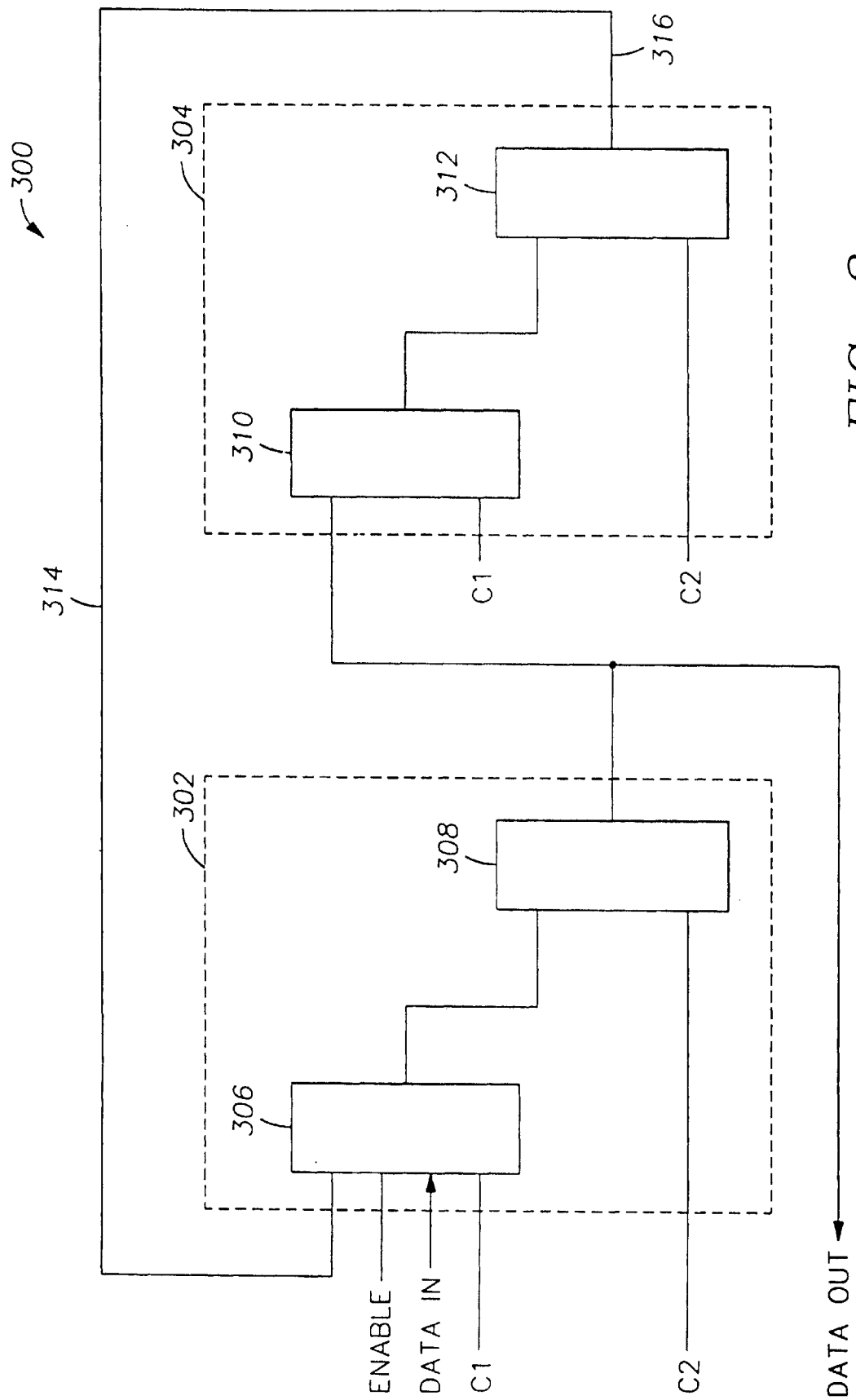
FIG. 3 is a hardware diagram of a dual SRL arrangement.
Figure 4:
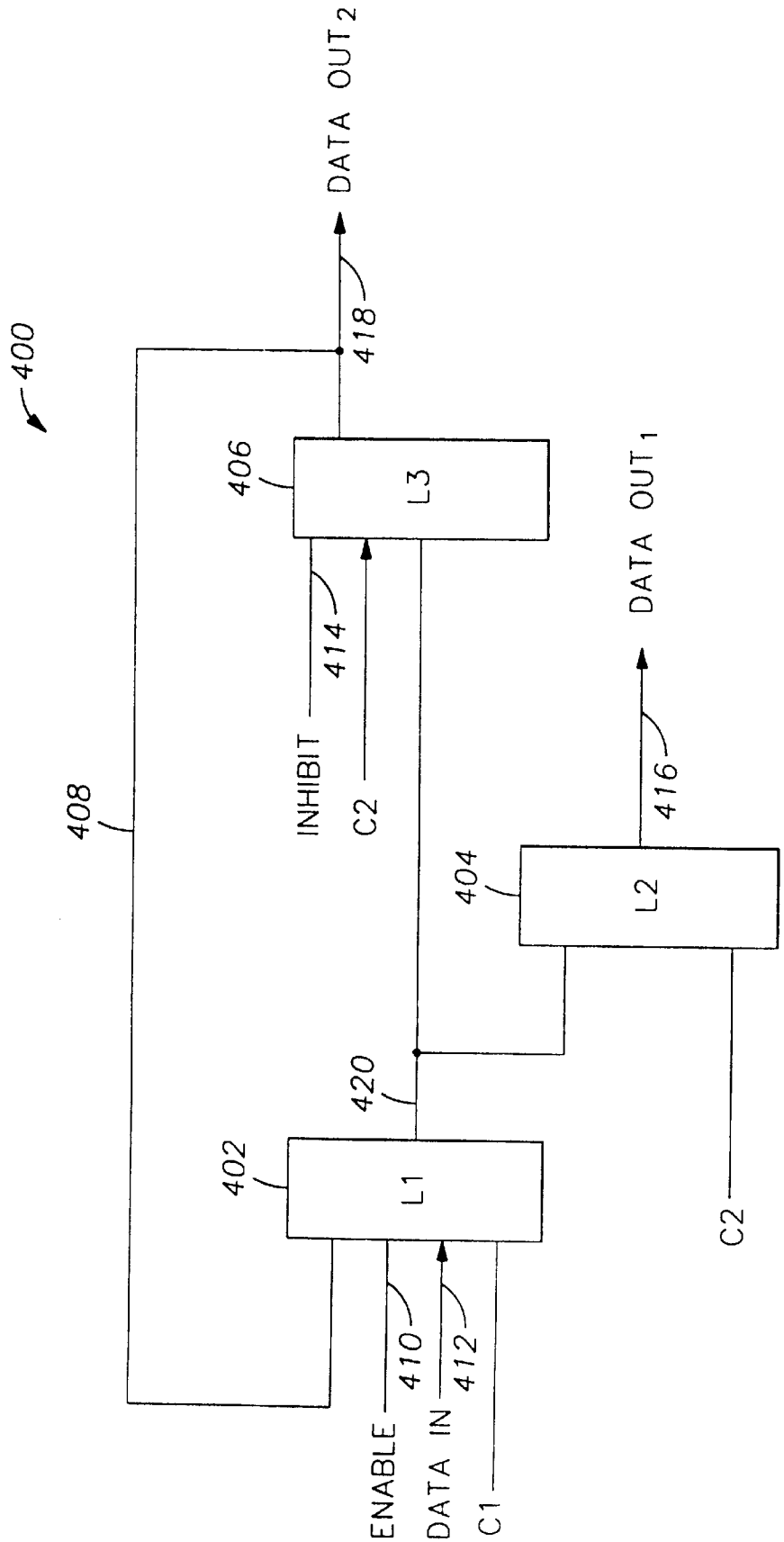
FIG. 4 is a hardware diagram of a SSRL.
Figure 5:
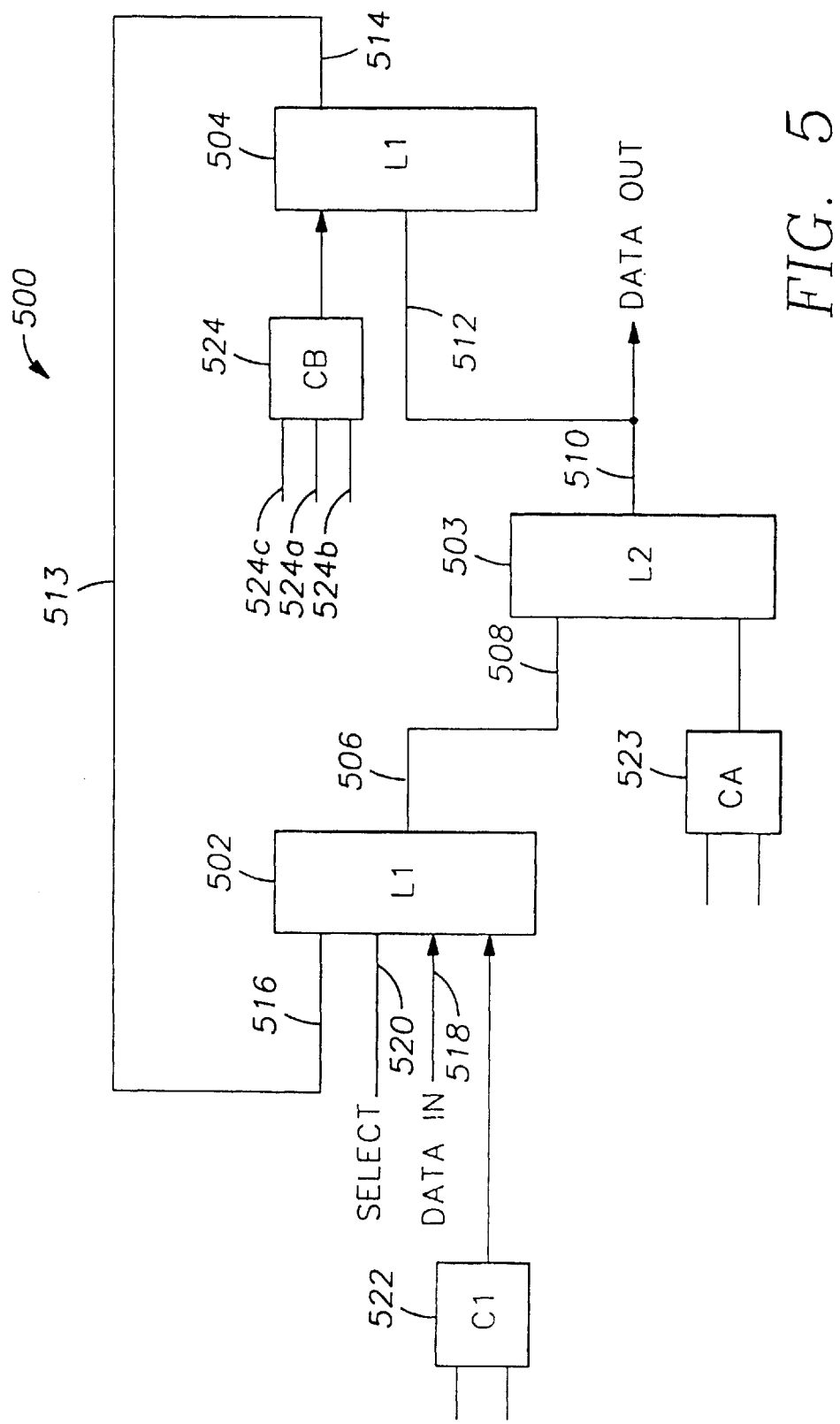
FIG. 5 is a hardware diagram of a latch feedback assembly of the present invention.

As one option, each of the latching stages may comprise one of the latch assemblies 100 FIG. 1), 200 (FIG. 2), 300 (FIG. 3), 400 (FIG. 4), or 500 (FIG. 5). Use of latching feedback assemblies in the latching stages is not necessary, however, and many other arrangements may be used. In the illustrated example, each latching stage is embodied by a SRL. After data is written to the register file 1102, the data and its address are sequentially advanced through all latching stages in the corresponding ADSR. During this time the ADSR therefore contains a "backup" copy of the data written to the register file 1102 as well as the corresponding address. If the data was written to the register file 1102 and an exception occurred, the data and address can thus be restored from the backup copy contained in the latching stages.

In this respect, each latching stage may include an inhibit line (not shown) to inhibit the overwriting of data in that latching stage; thus data in the latching stages may be preserved for restoration to the register file 1102 as discussed in greater detail below.

Depending upon which type of latching arrangement is used, the outputs of the second rank latching stages 1139 may be taken from a number of different sources, as shown in the following examples. If the latching stages are made up of SRLs 100 (FIG. 1), then their outputs are taken from the output line 116. If the latches are made up of modified SRLs 200, their outputs may be taken from the output line 216, or alternatively from the output line 210 after the signal on the line 216 has been latched back through the latch 202. If the latching stages are made up of SRL pairs 300 (FIG. 3), their outputs may be taken from the output line 316, for example. If the latches are made up of SSRLs 400, their outputs may be taken from the output line 418, or alternatively from the output line 420 after the signal on the line 418 has been latched back through the latch 402. If the latches are made up of latch feedback assemblies 500, their outputs may be taken from the output line 514, or alternatively from the output line 505 after the signal on the line 514 has been latched back through the latch 502.

Skilled artisans will also recognize other latching arrangements suitable for implementation in the latching stages of the invention.

Allocation of Read Ports

As mentioned above, the read ports 1106 may be allocated in a number of different ways. In one embodiment, the ADSR ports 1126 may simply comprise a sub-group of the ALU ports 1124, rather than additional ports. In many systems, the read ports 1106 are allocated as multi-port "source registers" such as the following: a base address, an address index, and a source data. Few register operations use all three source registers. As a result, the source data register (for example) may be shared between the ALUs 1128 and the backup register 1130. For register operations that require all three source registers, the ALU ports 1124 may be time-shared between the ALUs 1128 and the backup register 1130.

Preferably, however, the read ports 1106 include ALU ports 1124 and separate ADSR ports 1126 as illustrated. The ADSR ports 1126 comprise additional ports specifically dedicated for operation with the backup register 1130. This embodiment can advantageously facilitate multiple ALU operations concurrently with the transfer of data from the register file 1102 to the backup register 1130.

REGISTER FILE SAVE/RESTORE MECHANISM: OPERATION

In contrast to the hardware described above, another aspect of the invention concerns a method for backing up and restoring register file data in a pipelined processing system. For ease of explanation, this method is illustrated using the exemplary register file save/restore mechanism 1100 shown in FIG. 11.

FIG. 12 depicts an exemplary sequence of steps 1200 for operating the mechanism 1100. After the sequence 1200 begins in task 1202, the data is received in task 1204 for writing to the register file 1102. Although this data may be received from a source external to the mechanism 1100, it may originate from the mechanism 1100 itself. One example is where the ALUs 1128 provide their outputs to the selectors 1110, which forward the ALU outputs to the register file 1102. This received data is written to the register file in task 1206.

After task 1206, but before this data is overwritten, the backup register 1130 is used to store a copy of the data. In particular, the data and its register file address are clocked into ADSRs of the first stage 1138 of the backup register 1130. The register file address is clocked into the first stage of the ADSRs 1132 (from the write address decoder 1118), 1134, and the data is clocked into the first stage of the ADSRs 1133, 1135 (from the ADSR ports 1126). During exception free operation the data and address values proceed to enter and later exit the second stage ADSRs 1139 in subsequent clock cycles.

After query 1210 detects an occurrence of an exception, task 1212 "stalls the pipeline" by halting operation of the mechanism 1100 prior to the departure of the data and address from the backup register 1130. In task 1214, the data and address are preserved in the backup register 1130. This may be achieved, for instance, by temporarily discontinuing clocking of the ADSRs. As an alternative, the inhibit lines (not shown) may be triggered to prevent writing of new values to some or all of the ADSRs in the backup register 1130.

With the correct value of the data preserved in the backup register 1130, control advances to tasks 1216 and 1218. These tasks may be performed concurrently (as shown), or one after the other, depending upon the requirements of the application. In task 1216, control logic of the write address decoder 1122 configures the selectors 1120 to select the address stored in the backup register 1130. In task 1218, the control logic 1112 configures the selectors 1110 to select the data stored in the backup register 1130.

Next, in task 1220 the backup data is restored to the register file 1102 by clocking the backup data from the ADSRs 1133, 1135 into the register file address specified by the write address provided by the ADSRs 1132, 1134. After task 1220, task 1222 un-stalls the pipeline by resuming normal clocking of the mechanism 1100. The operation of the register file 1102 may be restarted, for example, by repeating the instruction that originally caused the exception. Also in task 1222, the exception may be presented to an exception handler or other appropriate module to initiate processing of the exception. After pipeline operation is unstalled in task 1222, normal operation of the mechanism 1100 resumes in task 1204.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for recovering from an exception in a pipelined processing system that utilizes precise exceptions, said processing system including multiple latches coupled in series, said multiple latches including a first latch, an intermediate latch, and a last latch, said method comprising the steps of:

a) continually sequentially latching input data into the first, intermediate, and latch latches according to successively delayed clock signals;

b) receiving notice of an exception; and c) in response to the exception, performing steps comprising:

interrupting step (a) by preventing latching of data into the last latch to preserve a current output of the last latch;

transmitting the current output from the last latch to the first latch and latching the current output to the first latch; and resuming performance of step (a).

2. The method of claim 1, interrupting step including the steps of placing a predetermined signal on an inhibit line of the last latch.

3. The method of claim 1, the exception comprising an error occurring in the processing system.

4. The method of claim 1, the exception comprising a software exception occurring in the processing system.

5. A method for recovering from an exception in a pipelined processing system, said processing system including multiple latches coupled in series, said multiple latches including a first latch, an intermediate latch, and a last latch, said method comprising the steps of:

a) providing a first clock signal having a first frequency and a first period to the first latch and providing successively ordered latches clock signals of the first frequency successively delayed by predetermined delay amounts, each delay amount being less than one period, and continually sequentially latching input data into the first, intermediate, and latch latches according to the clock signals;

b) determining whether an exception exists, and if so, performing steps comprising:

interrupting step (a) by preventing latching of data into the last latch to preserve a current output of the last latch; and transmitting the current output from the last latch to the first latch and latching the current output to the first latch; and resuming performance of step (a).

6. The method of claim 5, the interrupting step including the steps of placing a predetermined signal on an inhibit line of the last latch.

7. The method of claim 5, the step of resuming performance of step (a) further including repeating step (b).

8. The method of claim 5, each successively ordered clock signal being delayed by ¾ of the first period with respect to the preceding clock signal.

9. The method of claim 5, the clock signals having a 50% duty cycle.

10. The method of claim 5, the clock signals having less than a 50% duty cycle.

11. The method of claim 5, all of the successively ordered clock signals being delayed by a single predetermined amount with respect to the preceding clock signal.

12. The method of claim 5, the interrupting step comprising the steps of inhibiting clocking of the last latch.

13. The method of claim 5, the transmitting step comprising the steps of triggering a selector line of the first latch to select an input signal provided on a feedback line coupled to the output of the first latch.

14. A method for recovering from an exception in a pipelined processing system that utilizes precise exceptions, said processing system including multiple latches coupled in series, said multiple latches including a first latch, a second latch, and a third latch, each of the second and third latches being coupled in series with the first latch, said method comprising the steps of:

a) continually latching input data into the first latch according to a first clock signal;

b) continually latching input data from the first latch into the second latch according to a second clock signal, delayed with respect to the first clock signal;

c) latching data from the first latch into the third latch at predetermined times;

d) receiving notice of an exception; and e) in response to the exception, performing steps comprising:

inhibiting latching of the third latch to preserve a current output of the third latch;

avoiding latching data into the last latch;

transmitting the current output from the third latch to the first latch and latching the current output into the first latch; and restarting performance of step (a) beginning at a state the first latch was in when the first latch received data presently latched by the last latch, and resuming steps (a) through (c).

15. The method of claim 14, the inhibiting step including the steps of placing a predetermined signal on an inhibit line of the last latch.

16. The method of claim 14, each of the first, second, and third clock signals having a common predetermined frequency and a common predetermined period, the second clock signal being delayed from the first clock signal by a first delay amount less than the predetermined period, the third clock signal being delayed from the second clock signal by a second delay amount less than the predetermined period.

17. The method of claim 14, each of the first, second, and third clock signals having a 50% duty cycle.

18. The method of claim 14, each of the first, second, and third clock signals having less than a 50% duty cycle.

19. The method of claim 14, each of the first and second delay amounts being ¾ of the predetermined period.

* * * * *